(No Model.) 7 Sheets—Sheet 2.

O. ROTHROCK.
LOCOMOTIVE.

No. 277,428. Patented May 8, 1883.

Fig. 3.

Witnesses:
A. M. Long.
C. T. Belt.

Inventor.
Oscar Rothrock,
By Painer & Lood,
Attys.

(No Model.)

O. ROTHROCK.
LOCOMOTIVE.

Patented May 8, 1883.

Witnesses:
A. M. Long.
C. T. Belt.

Inventor
Oscar Rothrock,
By Painter & Lood
Att'ys.

(No Model.) 7 Sheets—Sheet 6.

O. ROTHROCK.
LOCOMOTIVE.

No. 277,428. Patented May 8, 1883.

Witnesses:
A. M. Long
C. J. Bell

Inventor.
Oscar Rothrock,
By Painer Lood,
Att'ys.

UNITED STATES PATENT OFFICE.

OSCAR ROTHROCK, OF BEECH CREEK, PENNSYLVANIA.

LOCOMOTIVE.

SPECIFICATION forming part of Letters Patent No. 277,428, dated May 8, 1883.

Application filed February 17, 1883. (No model.)

*To all whom it may concern:*

Be it known that I, OSCAR ROTHROCK, a citizen of the United States, residing at Beech Creek, in the county of Clinton and State of Pennsylvania, have invented certain new and useful Improvements in Locomotives; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

The present invention relates to that class of locomotives which carry their own supply of water and fuel; and it has for its object to provide a novel construction of boiler, water-tanks, and fuel-receiver, whereby the water and fuel carrying capacity of the locomotive is greatly increased over ordinary locomotives of a corresponding length and width, and the products of combustion from the fire-box are utilized in a most thorough and effective manner for generating steam more rapidly than in ordinary boilers, and with a less amount of fuel than heretofore.

To these ends the invention consists in a twin boiler, which is composed of two parallel sections or shells having smoke-flues, and communicating at their front ends with a fire chamber or box. A space or passage-way is left between the two boiler-sections for the reception of the engineer and the storage of fuel, and at the sides of the said passage-way are located water-tanks, which may also form the floor of the passage-way, and extend across the latter above the line of the boiler, in rear of the engine-room, so as to form a roof and tanks of a large capacity. Smoke-stacks are located at the rear ends of the boiler-sections; or a single centrally-located stack may receive the products of combustion from both boilers. A cab or housing extends above the passage-way, between the boiler-sections, for the protection of the engineer and fuel. The door of the fire-box is arranged at the front end of the aforesaid passage-way, and the valves, gages, reversing and brake levers, and other engine accessories are also located at this point. A steam-dome surmounting the fire-box receives the steam from both boiler-sections, and is connected with the valve-chests of the working-cylinders; or a steam-dome may be arranged above each boiler-section at points in rear of the fire-box.

The construction and arrangement of the various parts of my invention are briefly set forth in the above statement, and will hereinafter be more fully described, and then set forth in the claims.

I desire it to be understood that in describing my invention I use the term "locomotive" in its general or broadest sense, as my invention is applicable to railroad-locomotives of every description, traction, dummy, and agricultural engines, steam-propelled cars and carriages, and portable engines of all classes.

The letters A and B designate a pair of boilers, or a twin boiler composed of two longitudinal parallel sections. These boilers are provided with the customary flues, C, for the passage of the products of combustion, and are made either square, semi-elliptical, circular, or semicircular in cross-section, or of any other approved shape.

Figure 1:
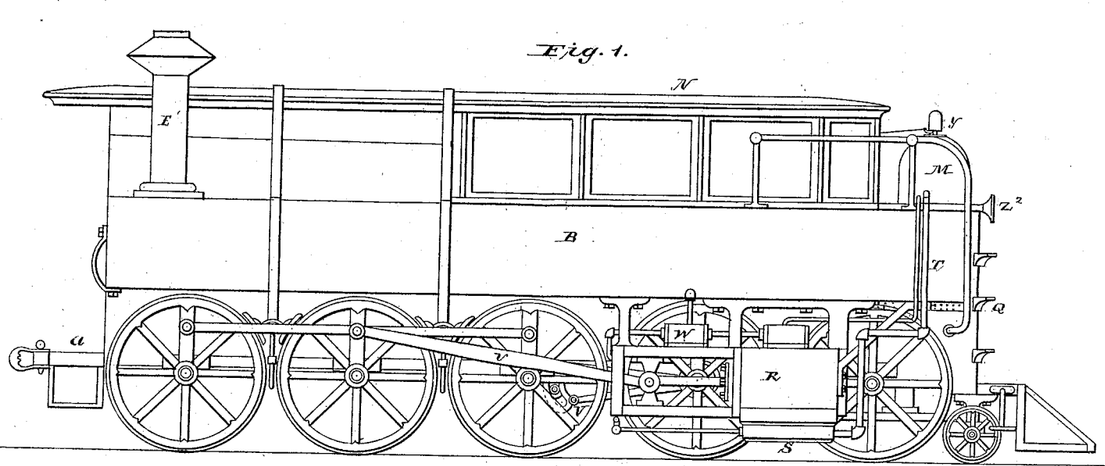
Figure 1 is a side elevation of a traction-locomotive or traction-engine adapted for running upon ordinary roads.
Figure 2:
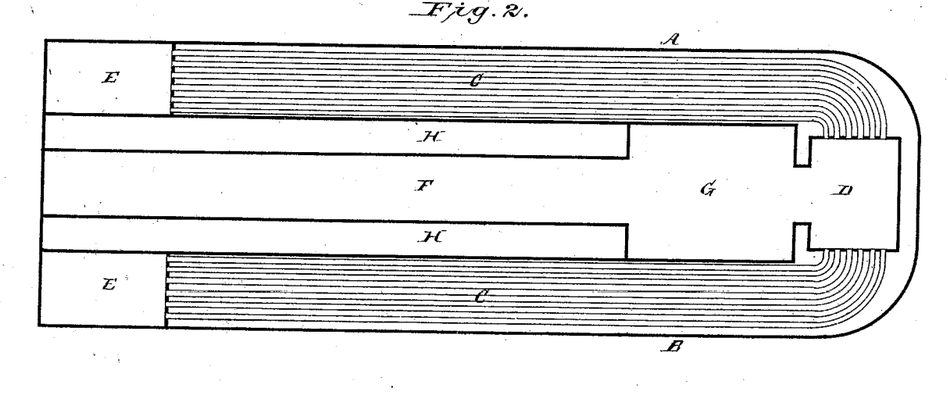
Fig. 2 is a longitudinal horizontal section of a boiler generally used in this form of locomotive.
Figure 3:
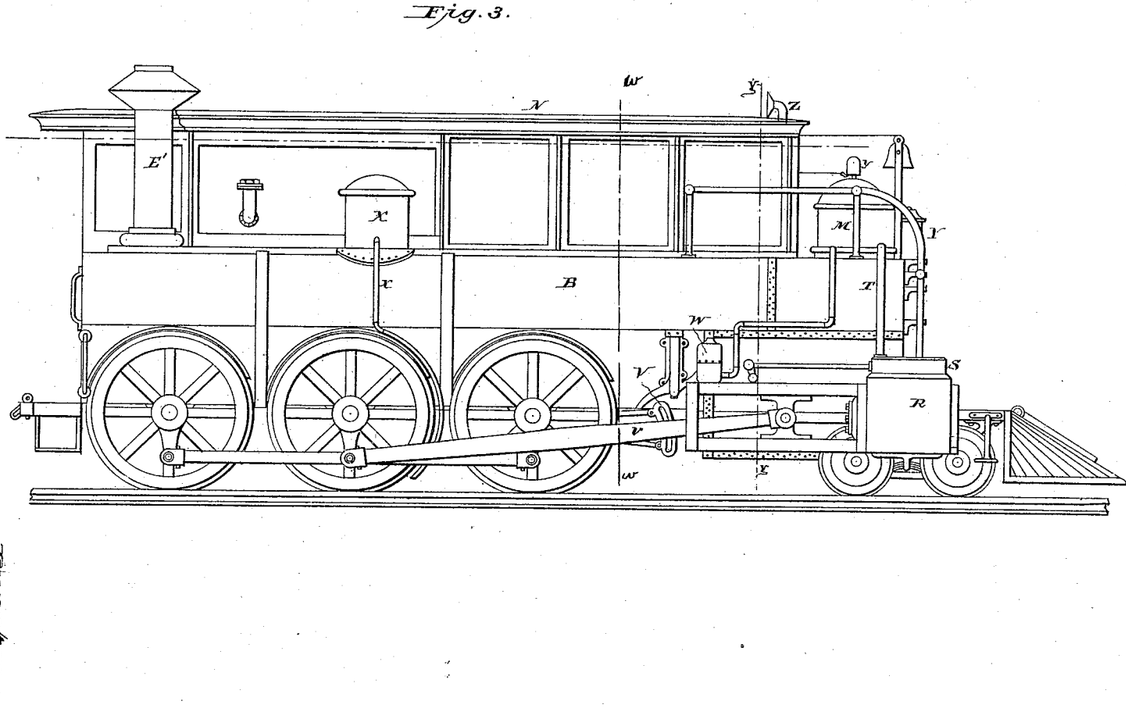
Fig. 3 is a side elevation of a railroad-locomotive combining speed and comparatively small tractive force.
Figure 4:
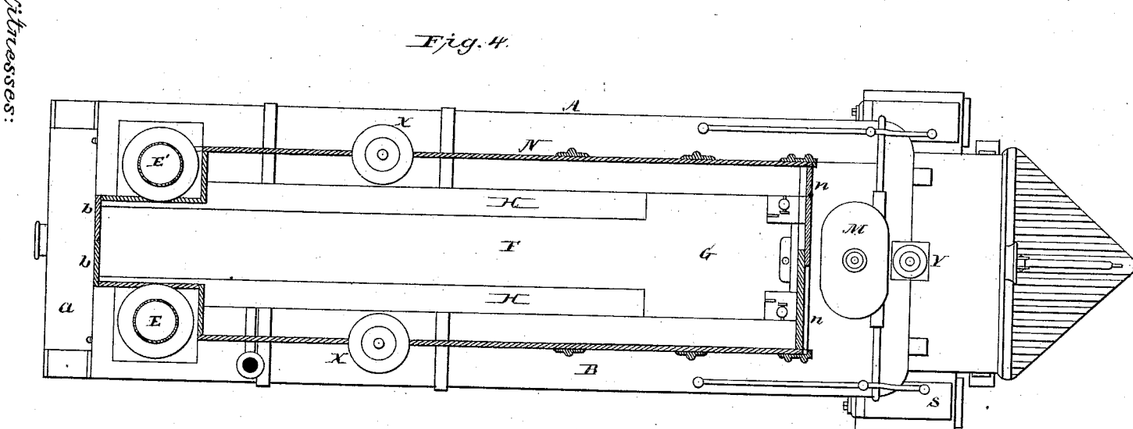
Fig. 4 is a horizontal longitudinal section taken through the line *x x*, Fig. 3.
Figure 5:
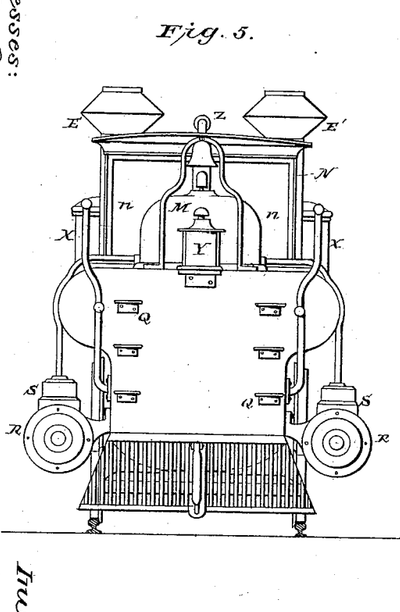
Fig. 5 is a front elevation of the locomotive shown in Figs. 3 and 4.
Figure 6:
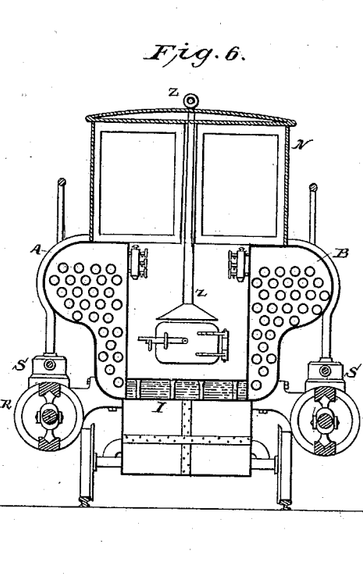
Fig. 6 is a transverse vertical section taken through the line *w w*, Fig. 3, showing the water-tanks extending along the boiler-sections, and forming the floor of the passage-way between the latter.
Figure 7:
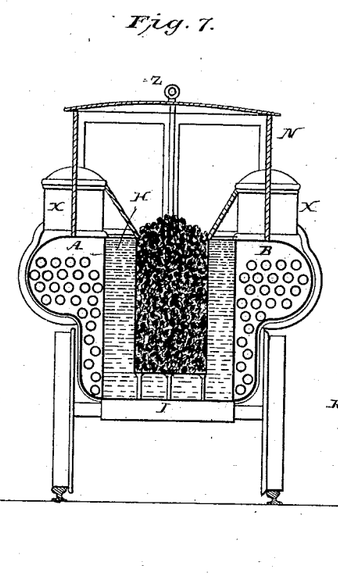
Fig. 7 is a transverse vertical section taken through the line *y y*, Fig. 3, showing the engine-room between the boiler-sections, the fire-box and its door, and other adjacent parts.
Figure 8:
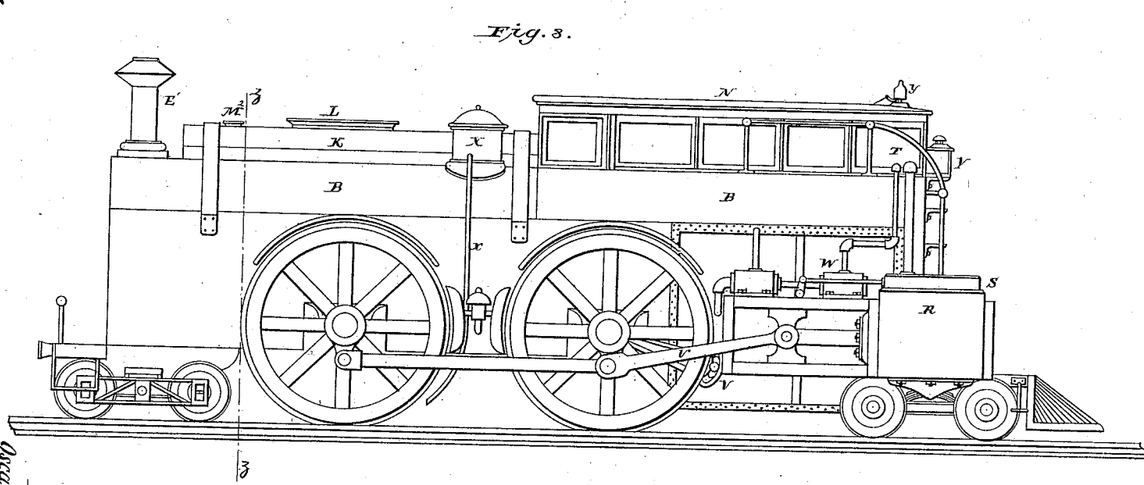
Fig. 8 is a side elevation of a locomotive having four large driving wheels and front and rear four-wheeled trucks, and a water-tank extending along the boiler-sections and across the passage-way between the same at the bottom and top, so as to form the floor and roof of said passage-way.
Figure 9:
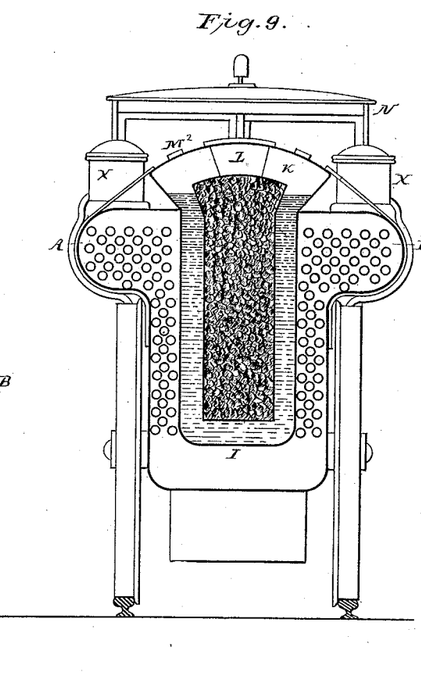
Fig. 9 is a vertical transverse section taken through the line *z z* of Fig. 8, showing the twin boilers connected at their bottoms, and the water-tanks resting between said boilers, and forming the floor and roof of the passage-way.

A fire-box or furnace, D, located at the front end of the boiler-sections, is in communication with the tubes or flues thereof for causing the products to pass through said flues in a rearward direction. The fire-box may extend entirely across the front ends of the boiler-sections and be in communication with straight boiler-flues extending through the front wall of the fire-box; or the latter may be arranged between the boiler-sections, at the front ends thereof, as is shown more clearly in Fig. 2, in which case the front ends of the flues are curved, so as to open into the fire-box through the side walls thereof.

Figure 10:
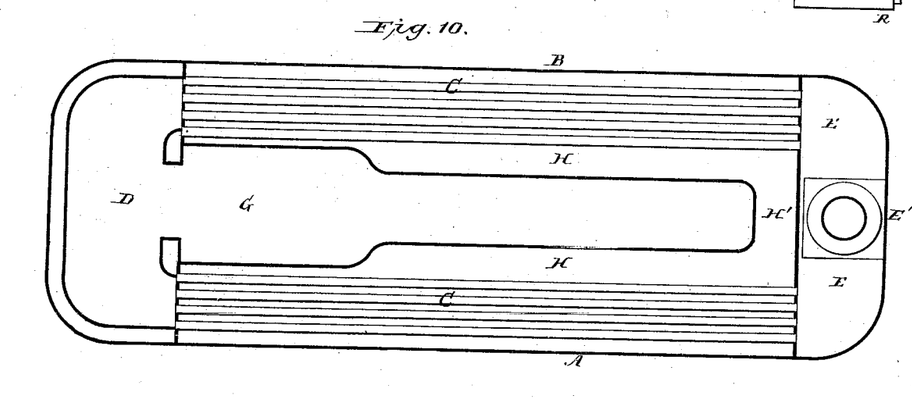
Fig. 10 is a diagrammatical view of a twin boiler having a front fire-chamber and a rear smoke-box communicating with a single centrally-located smoke-stack, the water-tank in the present instance extending along the sides of the passage-way between the boiler-sections and across the rear end thereof.
Figure 11:
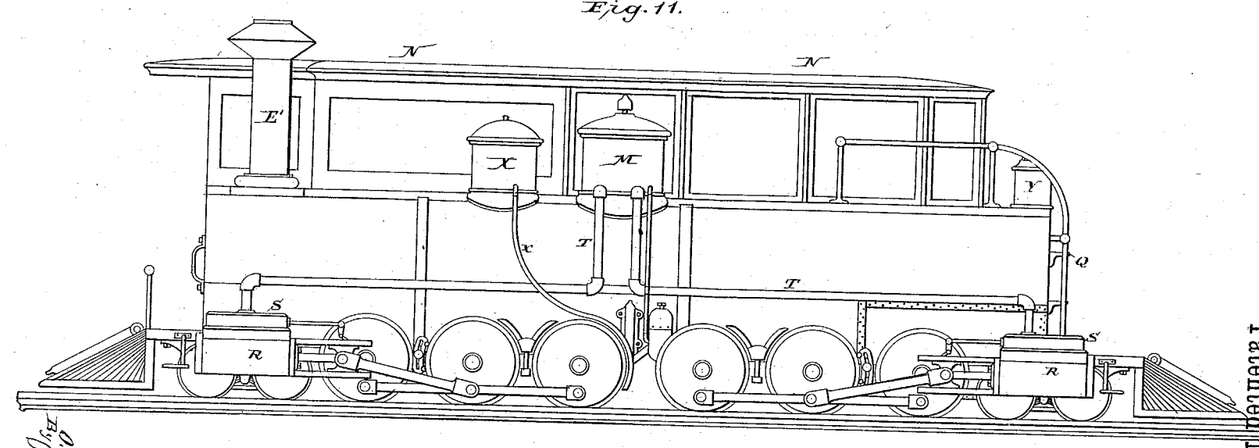
Fig. 11 is a side elevation of a "double-ender" or four-cylinder locomotive that can run with either end in front.
Figure 12:
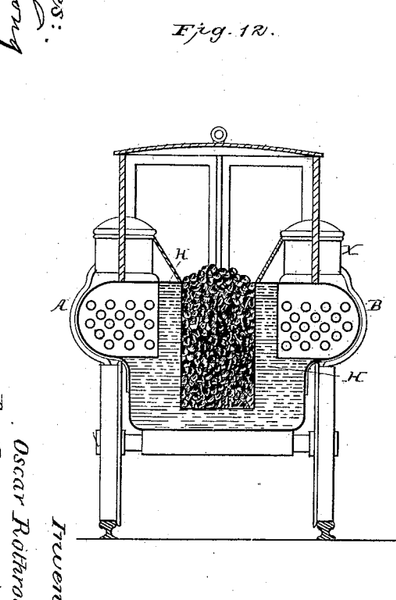
Fig. 12 is a cross-section of a locomotive in which the boiler-sections are supported upon a tank which forms the bottom and the sides of the passage-way between the boiler-sections.
Figure 13:
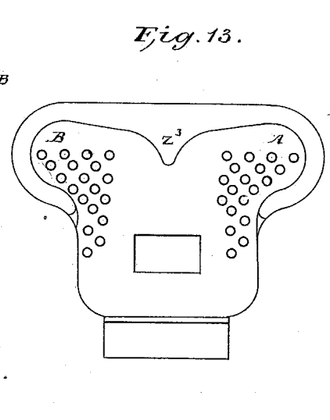
Fig. 13 is a transverse section taken through the fire-box of a locomotive having a water-crown for said fire-box, which is connected either with the water-tank or the boiler-sections.

Each boiler-section may be provided at its rear end with a smoke-box, E, having a suitable stack, E'; or the flues of both boiler-sections may discharge the products of combustion into a smoke box and stack common to both, as is shown in Fig. 10. The usual devices for creating a draft in the smoke-stack are in a locomotive embodying my system of steam-boilers taken away from the front ends of the smoke-flues and located at the rear thereof, where they will not interfere with the easy cleaning of the flues.

The sections A B, constituting the twin boiler, are placed a suitable distance apart, so as to form a longitudinal space or passage-way, F, between the same. At the sides of this passage are located water-tanks H, which run parallel with said sections and conform to the shape or contour thereof. These water-tanks may be made in one piece with the boiler-sections; or they may be constructed separate therefrom and be secured thereto in various ways. The arrangement of the tanks at the sides of the boiler-sections is such that a space or room, G, is formed at the front of the longitudinal passage leading to the fire-box for the accommodation of the engineer and the necessary appliances for operating the reversing-gear, brakes, and other parts of the locomotive mechanism requiring the direct attention of the engineer. This chamber or engine-room is generally formed by causing the lateral or vertical portions of the water-tanks to terminate at a proper distance from the fire-box. The floor of the passage-way between the boiler-sections, or, more precisely speaking, the floor of the space between the tanks located in said passage-way, is formed by connecting the vertical portions of the tanks by a transverse bottom section or bridge, I, which is in communication with the vertical portions of the tanks. A separate or independent floor made of any approved material not liable to be affected by heat may also span the space between two independent tanks or boiler-sections, in which case the tanks are supported upon said floor and are not themselves connected. The tanks may extend the entire length of the boiler-sections and terminate at the smoke-boxes E, so as to leave an opening at the rear for the introduction of the fuel and water, and permit the engineer and others to enter at the rear of the locomotive. A locomotive having water-tanks arranged in this last-described manner is provided with a rear platform, a, and doors b for closing the opening at the rear of the passage-way. The twin boilers, instead of being entirely separate or distinct from each other, may have a hollow connecting-section at the bottom, so as to provide a boiler in which the water can circulate from one vertical section to the other. This connecting bottom section of the boiler is seldom provided with fire-tubes, because it usually lies below the fuel-bed in the fire-box; but when such tubes are introduced spaces are left between the same for the passage of the reversing and brake levers. These levers, when passed through a bottom section of the boiler or tanks, operate in suitable steam-tight boxes or shells. The water-tanks may be of the same height as the boiler-sections; or they can be extended above the latter and connected with each other by means of a hollow crown-piece, which forms a roof, K, for the passage-way between the boilers or the vertical portions of the tanks. This roof or hollow crown-piece K does not extend the entire length of the vertical portions of the tanks, but runs from the engine-room to the rear of the locomotive.

A suitable trap or man-hole, L, in the roof serves for the introduction of the fuel into the passage-way, and suitable valves, $M^2$, are used for filling the water tank or tanks. The arrangement of connected tanks and covered fuel-space may be used in connection with a hollow back wall, H', which closes the opening at the rear of the passage-way, so that access to the locomotive can be had only at the front thereof; or the tanks can be arched over or connected at their tops, and the entrance-opening for fuel, &c., left at the rear. Instead of supporting the tanks upon the boilers, I may support the latter upon the former, in which instance the tanks are provided with an exterior ledge or horizontal offset for supporting the boiler-sections, the latter being secured in position by hoops or bands, which may encircle the boiler-sections and tanks, or be attached to the boilers, tanks, and running-gear in any approved manner. In order to prevent the lateral displacement of the boilers and tanks, or preserve the true parallelism of these parts, I may fit the boiler into a suitable cradle-shaped supporting-frame, which is secured to the running-gear or supporting-truck, and serves to effectually prevent the spreading of any of the parts referred to. It may be stated, however, that with tanks connected either at their bottoms or tops, or with boiler-sections having a connecting bottom portion, the parts possess the necessary strength to permit bracing or stay devices to be dispensed with.

I have heretofore stated that the boiler-sections discharge the products of combustion into two smoke-boxes provided each with a stack; but it is obvious that in a locomotive closed at its rear the smoke-box can extend entirely across the discharge ends of said boiler-section and be provided with a single centrally-located smoke-stack.

In certain classes of locomotives the boiler, instead of being of the twin pattern heretofore described—that is, a boiler having a passage-way between two parallel vertical sections—may be constructed with body or shell which carries the parallel water-tanks on its top, so as to form the aforesaid passage-way, the fire-box being placed in front of the boiler and extending below the latter, or to a line almost level with the track-rails, and a single smoke-stack arranged at the rear of the boiler, receiving the products of combustion passing in a rearward direction through the flues of the boiler.

It will be obvious that in the form of locomotive just described the top of the boiler forms the floor of the passage-way, and that the door of the fire-chamber is arranged above said floor, as is the case with the other forms of boilers.

The dome may be jacketed or provided with double walls, so as to serve as a water-reservoir which is in communication with the boiler for supplying the latter with water.

A large jacketed dome is generally used in connection with a fire-box resting upon a small front truck and going down behind the bearer of said truck to as low a point as possible. This lower extension of the fire-box may or may not be jacketed, as desired.

The fire-box, instead of forming part of the boiler and having a water-space in communication with the latter, may consist of an entirely separate structure, which is jacketed, and the water-jacket connected with the boiler or boilers and the tanks by means of pipes.

The steam generated in the boiler-sections may be conducted into a steam-dome, M, located above the fire-box; or each boiler may be provided with an independent steam-dome located at some point above the boiler in rear of the fire-box. The arrangement of the steam dome or domes depends altogether upon the nature of the locomotive or the relative position of the various parts thereof.

A cab or housing, N, is placed or supported on the twin boiler, and covers the space or passage-way between its component sections. This cab is made of any approved length and width, and may serve to cover the boilers and other parts completely; or when the rear portions of the water-tanks form a roof the cab need not extend farther than from the front of the locomotive to said roof portion of the tanks. The cab has sliding glass-paneled doors $n$ at the front and sliding or stationary windows at its sides and rear, so as to enable the engineer to obtain an unobstructed view of the road in advance of the locomotive and the train in rear of the same. The engineer and attendants enter the cab through the front doors, steps or projections Q being provided at the front of the locomotive for permitting the ascent and descent. I may, if necessary, make the front of the locomotive, or the fire-box thereof, with a rearwardly-inclined wall or sloping front, so as to facilitate the passage to and from the cab. When the rear of the passage-way is open the doors located thereat serve as additional means for the entrance and exit of the locomotive attendants.

It will be understood that the fuel lies on the floor or platform in rear of the engine-room or space occupied by the engineer and fireman; but it can also be placed in bunkers extending along the boilers. The fuel being thus placed, it can be shoveled very conveniently into the fire-chamber.

It will be unnecessary to describe minutely the various parts which go to make up a complete locomotive, because the invention relates altogether to the devices for generating the steam and the means for carrying fuel and water.

In order to obtain a clear understanding of the relative position of the most prominent parts belonging to the engine and running-gear and the devices embodied in my invention, I would state that R designates the piston-cylinder, and S the valve-chest, which may be located either above or below the cylinder.

T is the steam-pipe leading from the steam-dome to the valve-chest, such pipe being duplicated at each side of the boiler when steam is to be supplied to a four-cylinder locomotive.

$v$ is the main connecting-rod for turning the driving-wheels, and V the link-motion, which is controlled by the lever running into the cab, either through the bottom of the boiler or tank, or passing into the cab from the outside of the locomotive.

W is the feed-pump for forcing the water from the tank into the boiler.

X is the sand-box, and $x$ its discharge-pipe; Y, the head-light, and $y$ the steam-whistle.

I may add, as a further description of the steam-generating devices, that the steam-boilers are made of such a shape that the driving-wheels can be set thereunder, this being generally effected by giving the boiler-sections an external bulge. Spaces may also be left in the bottoms of the boilers or the tanks for the passage of the axle of the driving-wheels. The fire-box, as in ordinary locomotives, may also have water-jackets forming part of the steam-boilers, and it may be provided with a hollow crown-piece, $Z^3$, having a downwardly-projecting central portion for deflecting the products of combustion, and this crown-piece may form part of the water-tank for heating the water; or it may communicate with the boiler. For the purpose of preventing the escape of smoke and gases into the engine-room when the fire-door is opened, I locate in proper relation to said fire-door opening a hood provided with a tube, $z$, leading through the roof of the cab. The small amount of smoke passing out through the door enters the hood and escapes through its pipe. A proper draft is obtained in the fire-chamber of a traction or other engine by a pipe having a funnel or blower, $Z^2$, which is arranged in front of the locomotive and admits air into the fire-chamber. This pipe is provided with a suitable stop-cock for shutting off the influx of air when necessary.

Having thus described my invention, what I claim as new, and desire to secure by Letters Patent, is—

1. A twin locomotive or other portable steam boiler having a longitudinal space or passage between the same, and provided with a front fire-box and a rear smoke-stack, substantially as and for the purpose set forth.

2. A twin locomotive or other portable steam boiler having a space or passage between the same, and tanks or bunkers extending along the sides of said passage, substantially as and for the purpose set forth.

3. A twin locomotive or other portable steam boiler consisting of two parallel longitudinal sections having a water-tank made of two vertical sections, and a transverse bottom section arranged between said boiler-sections and forming a passage between the vertical sections of said tank, substantially as and for the purpose set forth.

4. A twin locomotive or other portable boiler having a space or passage between the same, and vertical tanks or bunkers extending along the sides of said passage, and provided with a hollow crown-piece communicating with said vertical-tank sections and constituting a roof for the aforesaid passage, substantially as and for the purpose set forth.

5. In a locomotive, the combination of a twin boiler, a front fire-box, a passage or way extending from said fire-box to the rear of the boiler, a cab or housing arranged over said passage or way, and a smoke stack or stacks applied to the rear of the boiler, substantially as and for the purpose set forth.

6. In a locomotive, the combination of a series of steps or offsets on the front of the fire-box, or front end of the locomotive, boiler-sections leading rearward from said fire-box, so as to leave an intermediate passage and engine-room, and a cab or housing surmounting said passage, having movable doors, substantially as and for the purpose set forth.

7. A locomotive or other portable engine boiler having two parallel tanks or bunkers supported thereon, a longitudinal space or passage-way arranged between said tanks, a front fire-chamber having its door located above the top of the boiler or floor of the passage-way, and a rear smoke-stack, substantially as and for the purpose herein set forth.

In testimony whereof I affix my signature in presence of two witnesses.

OSCAR ROTHROCK.

Witnesses:
    J. R. YOUNGMAN,
    D. R. STOUGHTON.